United States Patent
Hoffend, III

(10) Patent No.: US 9,242,186 B2
(45) Date of Patent: Jan. 26, 2016

(54) LOFT BLOCK WITH ALIGNED SHEAVES

(71) Applicant: Electronic Theatre Controls, Inc., Middleton, WI (US)

(72) Inventor: Donald A. Hoffend, III, Annandale, VA (US)

(73) Assignee: Electronic Theatre Controls, Inc., Middleton, WI (US)

( * ) Notice: Subject to any disclaimer, the term of this patent is extended or adjusted under 35 U.S.C. 154(b) by 0 days.

(21) Appl. No.: 14/343,066

(22) PCT Filed: Oct. 26, 2012

(86) PCT No.: PCT/US2012/062131
§ 371 (c)(1),
(2) Date: Mar. 6, 2014

(87) PCT Pub. No.: WO2013/063400
PCT Pub. Date: May 2, 2013

(65) Prior Publication Data
US 2015/0083879 A1   Mar. 26, 2015

Related U.S. Application Data

(60) Provisional application No. 61/552,290, filed on Oct. 27, 2011.

(51) Int. Cl.
*A47H 1/10* (2006.01)
*A63J 1/02* (2006.01)
(Continued)

(52) U.S. Cl.
CPC . *A63J 1/028* (2013.01); *B66D 1/28* (2013.01); *B66D 1/36* (2013.01); *B66D 1/60* (2013.01); *F16M 13/022* (2013.01)

(58) Field of Classification Search
CPC ......... F16M 13/022; A63J 1/028; B66D 1/56; B66D 1/38; B66D 1/28
See application file for complete search history.

(56) References Cited

U.S. PATENT DOCUMENTS 3,944,185 A    3/1976  Evans
4,062,519 A *  12/1977  Jacobs .......................... 160/331
(Continued)

FOREIGN PATENT DOCUMENTS

KR         100972000         7/2010

OTHER PUBLICATIONS

PCT/US2012/062131 International Search Report and Written Opinion, Dated Jan. 22, 2013 (16 pages).
(Continued)

*Primary Examiner* — Amy Sterling
(74) *Attorney, Agent, or Firm* — Michael Best & Friedrich LLP

(57) ABSTRACT

A lift system configured to lift an article (e.g., a batten). The lift system includes a first cable configured to be coupled to the article, a second cable configured to be coupled to the article, a drive mechanism coupled to the first cable and the second cable and operable to raise and lower the article, a first loft block including a first loft sheave to redirect the first cable from a first substantially horizontal axis to a first substantially vertical axis, and an idler sheave to direct the second cable along a second substantially horizontal axis. The lift system further includes a second loft block including a second loft sheave to redirect the second cable from the second substantially horizontal axis block to a second substantially vertical axis.

20 Claims, 7 Drawing Sheets

(51) Int. Cl.
  *B66D 1/60* (2006.01)
  *F16M 13/02* (2006.01)
  *B66D 1/36* (2006.01)
  *B66D 1/28* (2006.01)

(56) References Cited

U.S. PATENT DOCUMENTS

| | | | |
|---|---|---|---|
| 4,606,527 A * | 8/1986 | Ziller et al. | 254/336 |
| 4,850,415 A * | 7/1989 | Rometsch | 160/84.02 |
| 6,520,485 B1 * | 2/2003 | Soot | 254/331 |
| 7,766,308 B2 * | 8/2010 | Kochan et al. | 254/394 |
| 2004/0099852 A1 * | 5/2004 | Hoffend et al. | 254/331 |
| 2006/0163548 A1 | 7/2006 | Kochan et al. | |
| 2007/0001158 A1 | 1/2007 | Hoffend, Jr. | |
| 2013/0015315 A1 * | 1/2013 | Hoffend et al. | 248/542 |

OTHER PUBLICATIONS

PCT/US2012/062131 International Preliminary Report on Patentability, Dated Dec. 20, 2013 (17 pages).

Extended European Search Report for Application No. 12843747.2 dated Aug. 3, 2015 (7 pages).

* cited by examiner

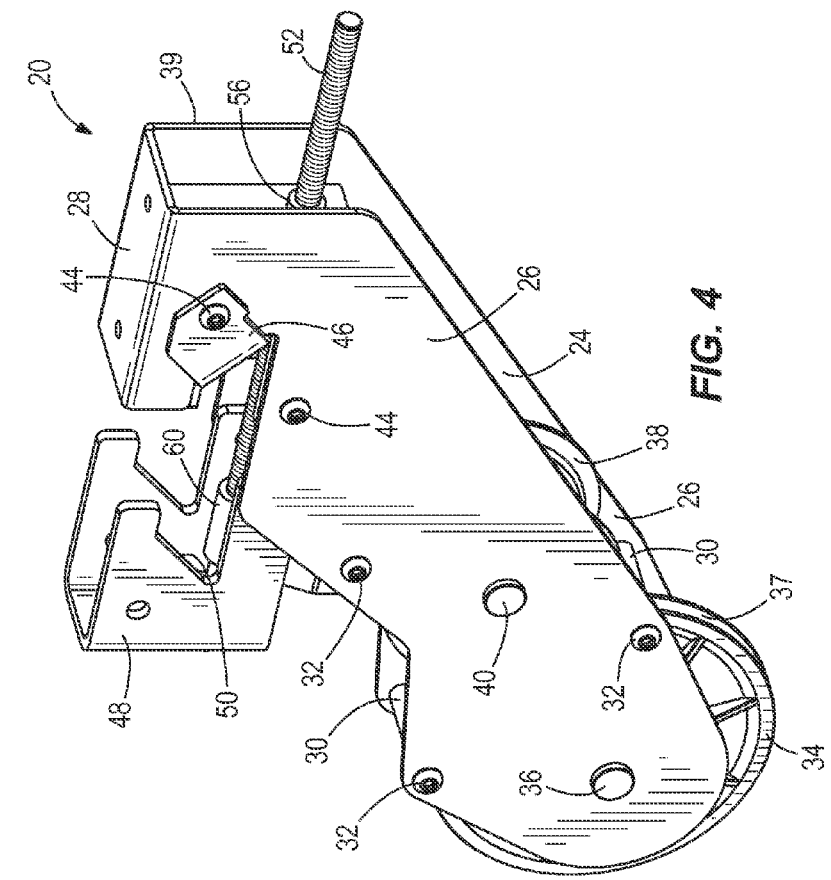
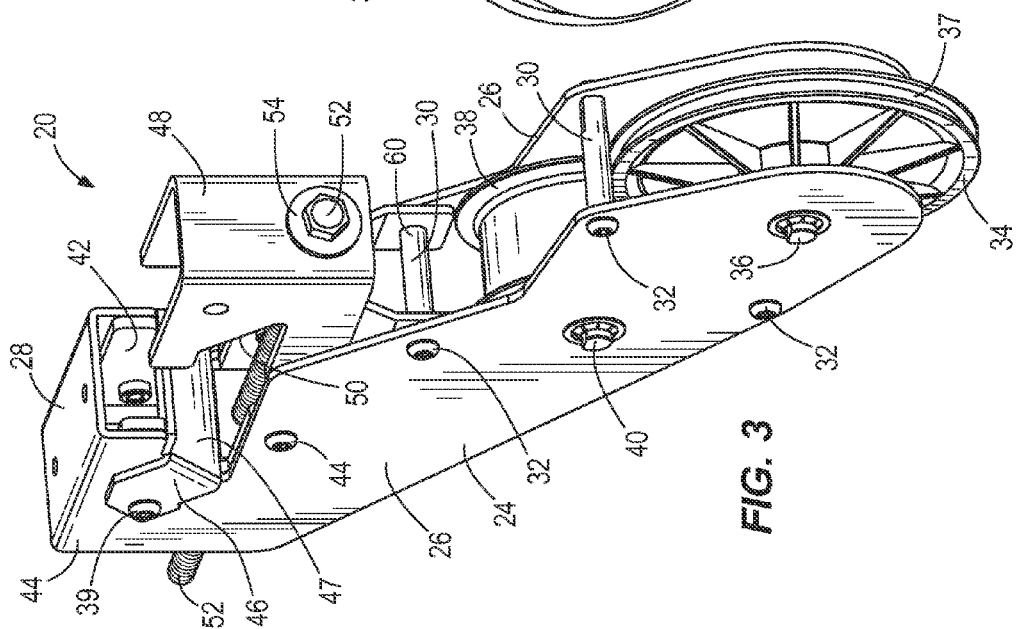
FIG. 4
FIG. 3

LOFT BLOCK WITH ALIGNED SHEAVES

CROSS-REFERENCE TO RELATED APPLICATIONS

This application is a national stage filing under 35 U.S.C. 371 of International Application No. PCT/US2012/062131, filed Oct. 26, 2012, which claims priority to U.S. Provisional Patent Application No. 61/552,290, filed Oct. 27, 2011. These applications are incorporated herein by reference in their entirety.

BACKGROUND

The present invention relates to theatre rigging equipment and specifically to lift systems for raising and lowering a load in theatrical and staging environments.

Performance venues such as theaters, arenas, concert halls, auditoriums, schools, clubs, convention centers, and television studios can employ battens or trusses to suspend, elevate, and/or lower lighting, scenery, draperies, and other equipment that can be moved relative to a stage or floor. Such battens can include pipe or joined pipe sections that form a desired length of the batten. Battens can be 50 feet or more in length. To support heavy loads or suspension points are that spaced apart (e.g., 15-30 feet apart), the battens may be fabricated in various configurations, such as ladder, triangular, or box truss configurations. A number of elevating or hoisting or lift systems are available for supporting, raising, and lowering battens and/or articles used in such venues.

One such lift system utilizes elongated flexible members, such as cables, to provide movement to the batten. Loft blocks are commonly mounted above the stage to facilitate directing the cables from a horizontal orientation to a vertical orientation. Lift systems of this type are disclosed in U.S. Pat. No. 8,033,528; U.S. Pat. No. 7,775,506; U.S. Patent Application Publication No. 2009/0127527, and International Patent Application Publication No. WO 2011/063141. The entire contents of each of the above-reference patent applications is hereby incorporated by reference herein in their entirety.

SUMMARY

In one embodiment, the invention provides a lift system configured to lift an article (e.g., a batten). The lift system includes a first cable configured to be coupled to the article, a second cable configured to be coupled to the article, a drive mechanism coupled to the first cable and the second cable and operable to raise and lower the article, a first loft block including a first loft sheave to redirect the first cable from a first substantially horizontal axis to a first substantially vertical axis, and an idler sheave to direct the second cable along a second substantially horizontal axis. The lift system further includes a second loft block including a second loft sheave to redirect the second cable from the second substantially horizontal axis block to a second substantially vertical axis.

In another embodiment, the invention provides a loft block assembly including a hanger configured to be secured to a structural member, a loft sheave coupled to the hanger and configured to direct a first cable from a first orientation to a second orientation, the loft sheave mounted for rotation about a loft axis and within a loft plane perpendicular to the loft axis. The loft block assembly further includes an idler coupled to the hanger and configured to guide a second cable through the loft block assembly, the idler mounted within the loft plane.

In another embodiment, the invention provides a loft block assembly including a hanger configured to be secured to a structural member, a loft sheave coupled to the hanger and configured to redirect a first cable from a first substantially horizontal axis to a substantially vertical axis, and an idler coupled to the hanger for movement with the hanger and configured to direct a second cable along a second substantially horizontal axis. The idler is located at least partially above the first horizontal axis and the substantially vertical axis extends through the idler such that at least a portion of the idler vertically overlaps the loft sheave.

Other aspects of the invention will become apparent by consideration of the detailed description and accompanying drawings.

BRIEF DESCRIPTION OF THE DRAWINGS

FIG. 3 is right front perspective view of the loft block assembly of FIG. 2.

FIG. 4 is a rear perspective view of the loft block assembly of FIG. 2.

DETAILED DESCRIPTION

Figure 1:
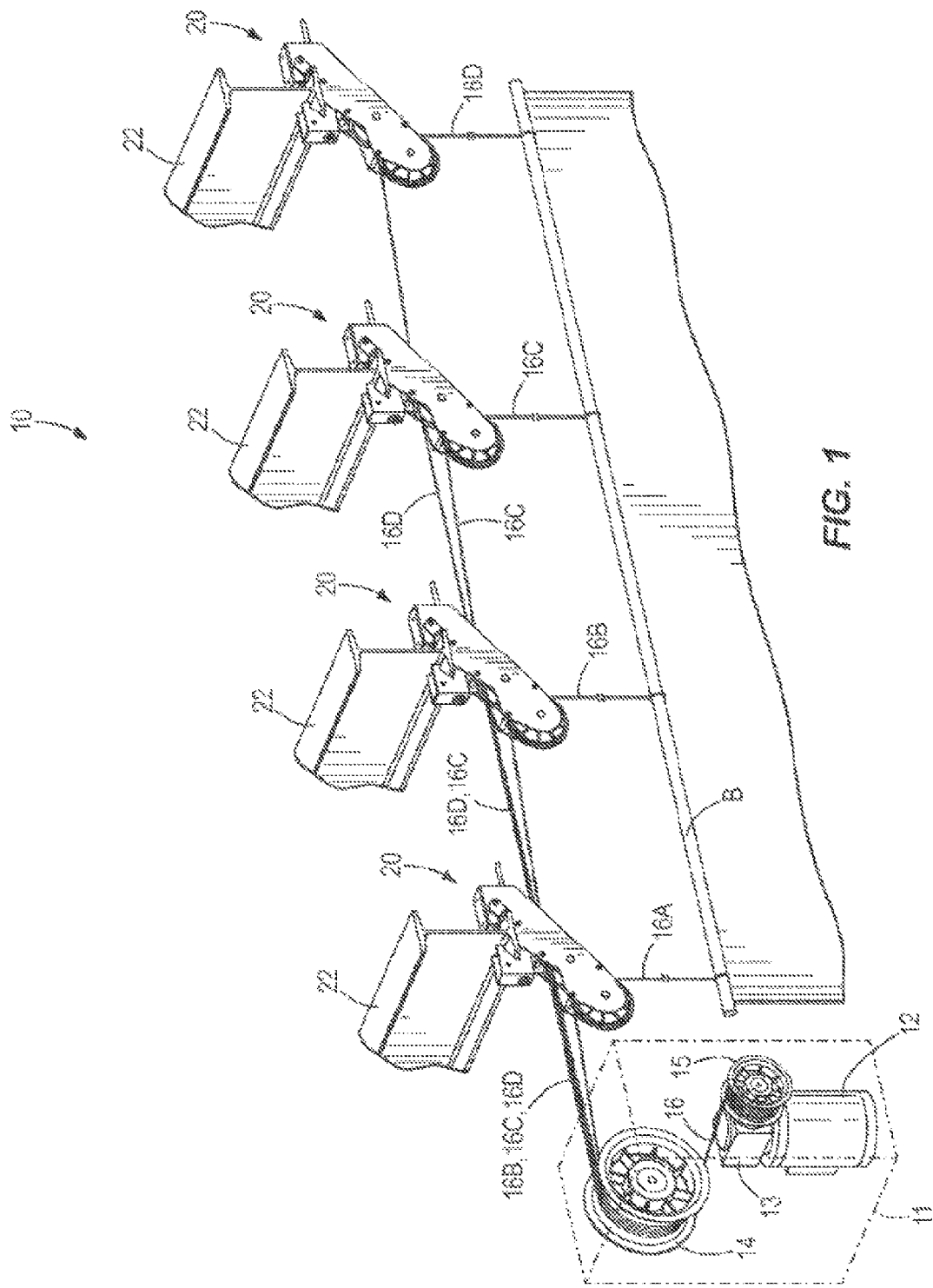
FIG. 1 is a perspective view of a lift system according to an embodiment of the invention.

FIG. 1 illustrates a lift system 10 that is operable to raise and lower an article, which includes a batten B in the illustrated embodiment. The lift system 10 includes a drive mechanism 11. The illustrated drive mechanism 11 includes a motor 12, for example, an electric motor, a gearbox 13, a traction drive 14, and a drum 15. The motor 12 is operable to rotate the drum 15, via the gearbox 13, in a winding (raising) rotation and an unwinding (lowering) rotation of the drum 15.

The lift system 10 further includes a plurality of cables 16. The cables 16 can be wound and unwound about the drum 15 via operation of the motor 12, which rotates the drum 15, to raise and lower the batten B. The cables 16 can include any suitable flexible member, including wire, rope, and the like. The illustrated cables 16 extend from the drive mechanism 11 in a generally horizontal orientation to a plurality of loft block assemblies 20 that redirect the cables 16 to a generally vertical orientation. In the illustrated embodiment, each of the loft block assemblies 20 are generally the same so only one of the loft block assemblies 20 will be described in detail.

Figure 2:
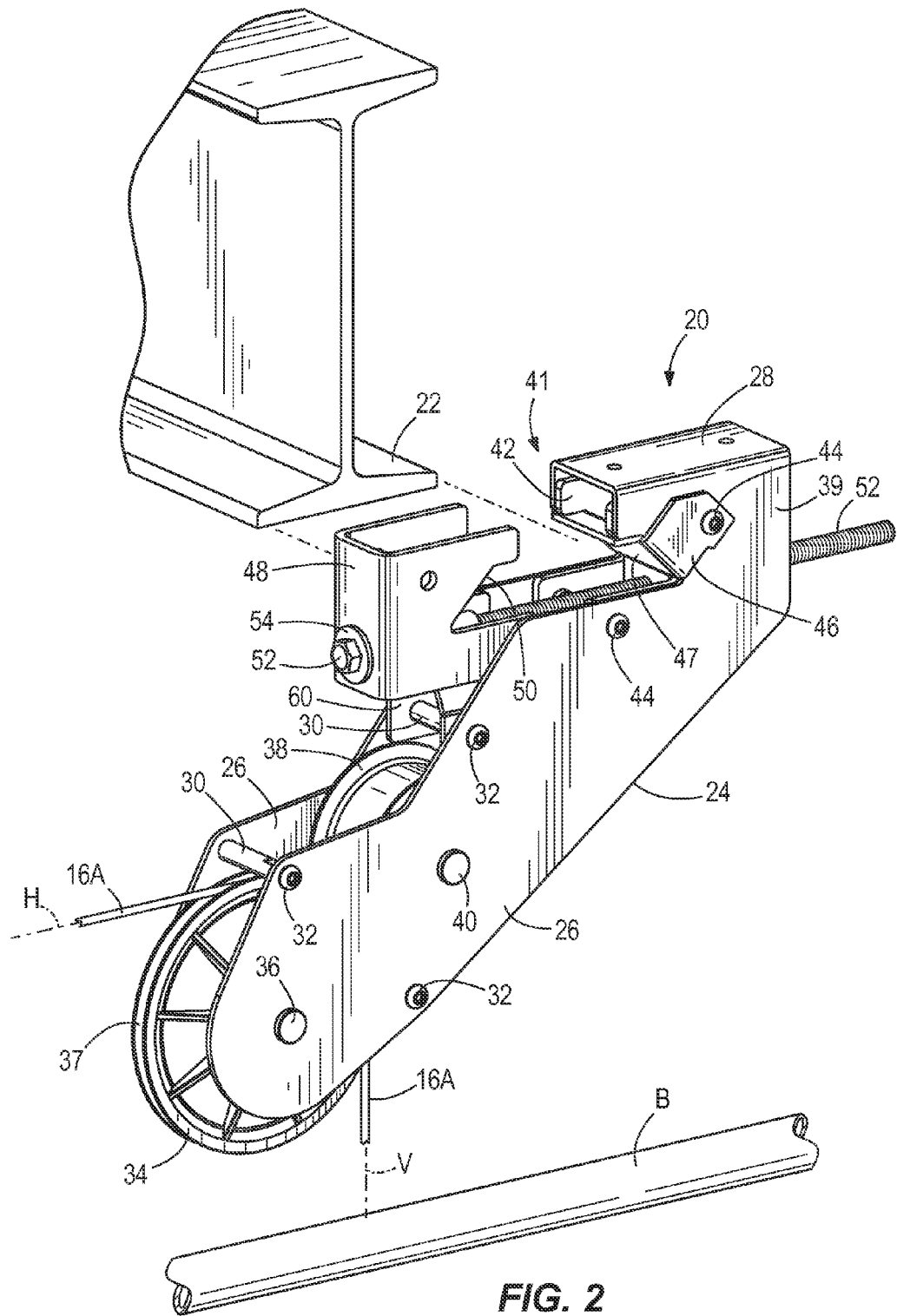
FIG. 2 is a left front perspective view of a loft block assembly of the lift assembly of FIG. 1.

Referring to FIG. 2, the loft block assembly 20 is adapted to be secured to a structural member, such as an I-beam truss 22 in a building. For example, the loft block assembly 20 can be secured to the lower edge of the ceiling truss 22. It should be understood that the loft block assembly 20 can be modified to be secured to other structural members having other shapes.

Figure 5:
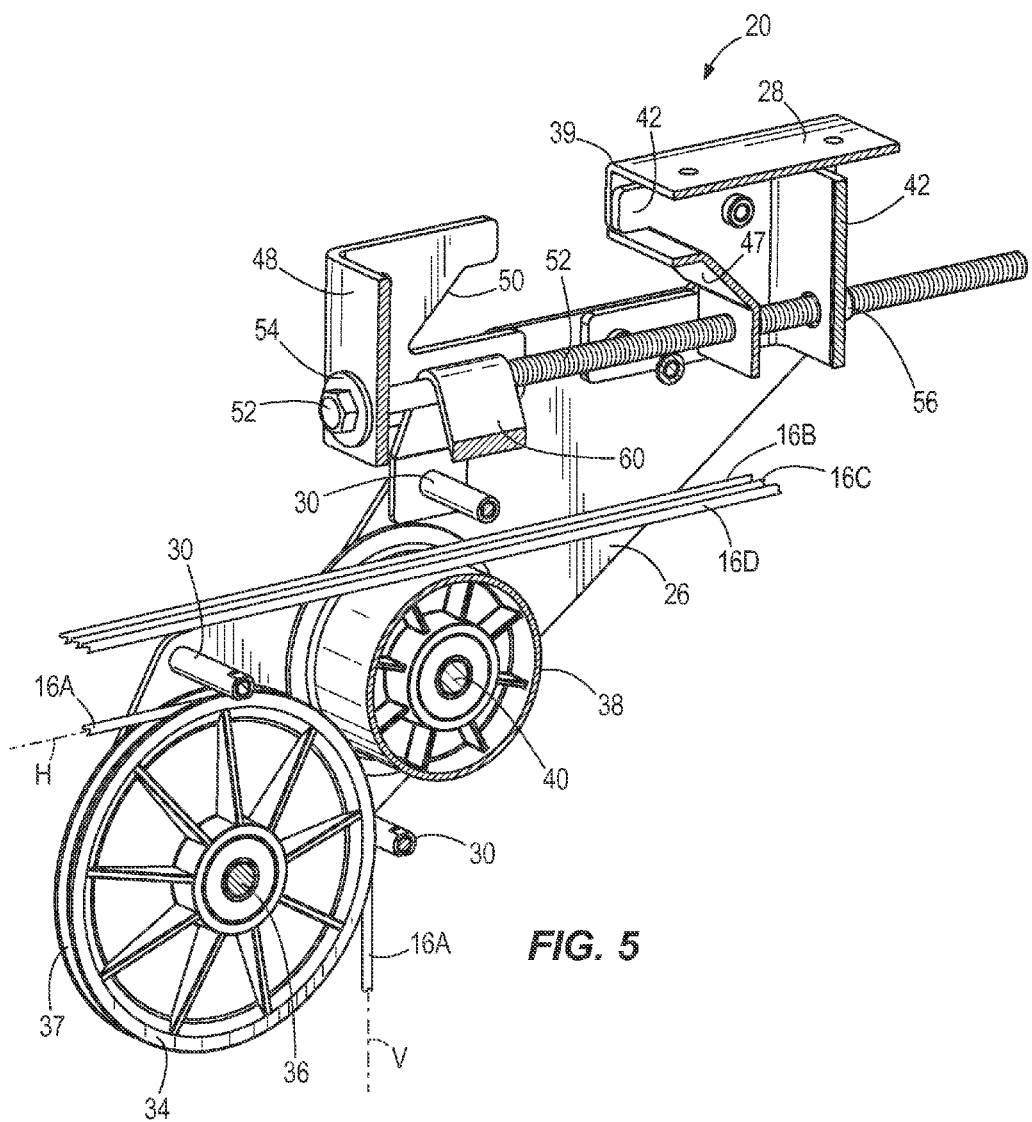
FIG. 5 is a section view taken along line 5-5 in FIG. 7.

The illustrated loft block assembly 20 includes a hangar 24 having two parallel side walls 26 connected to each other by a top wall 28. In the illustrated embodiment, the top wall 28 and the side walls 26 are integrally formed as a single component, and in other embodiments, the walls 26 and 28 can be made as separate components and fastened together. A series of three spacers 30 maintain a desired spacing between the side walls 26, and three corresponding fasteners 32 secure the spacers to the side walls 26. A loft sheave 34 is mounted for rotation between the side walls 26 and is held in position by a sheave axle 36. Similarly, an idler member in the form of an idler sheave 38 is positioned between the side walls 26 and is mounted for rotation about an idler axle 40 parallel to the sheave axle 36. A first cable 16A is designed to travel along a substantially horizontal axis H that extends through the center of cable 16A as illustrated in FIG. 2, wrap around a portion of the loft sheave 34, and continue travel along a substantially vertical axis V that extends through the center of cable 16A as illustrated in FIG. 2 until the end of the first cable 16A is attached to the batten B (in any suitable manner). Referring to FIG. 5, two of the spacers 30 are positioned closely adjacent to the loft sheave 34 in order to keep the first cable 16A in a groove 37 of the loft sheave 34. Other cables 16B, 16C, 16D pass above the forward-most spacer 30 and onto the idler sheave 38 to pass through the loft block assembly 20 and onto the other loft blocks assemblies 20 (see FIGS. 1, 5, and 6).

With continued reference to FIG. 2, a top end portion 39 of the hangar 24 includes a support 41 that attaches the loft block assembly 20 to the structural member 22. The illustrated support 41 includes a stationary hook support 42 secured to the side walls 26 by two bolts 44 on each side. A flange plate 46 is wrapped around the outer surfaces of the side walls 26 and is secured in place by two of the bolts 44 used to secure the stationary hook support 42. The flange plate 46 includes a stationary sloped surface 47 that is adapted to engage a lower edge of the ceiling truss 22. The flange plate 46 is positioned in the opposite side of the I-beam truss 22 from where the cables 16 are powered, and thus the flange plate 46 acts as a structural member to take a large part of the angular load applied to the loft block assembly 20 by the horizontal and vertical legs of the cables 16.

Figure 8:
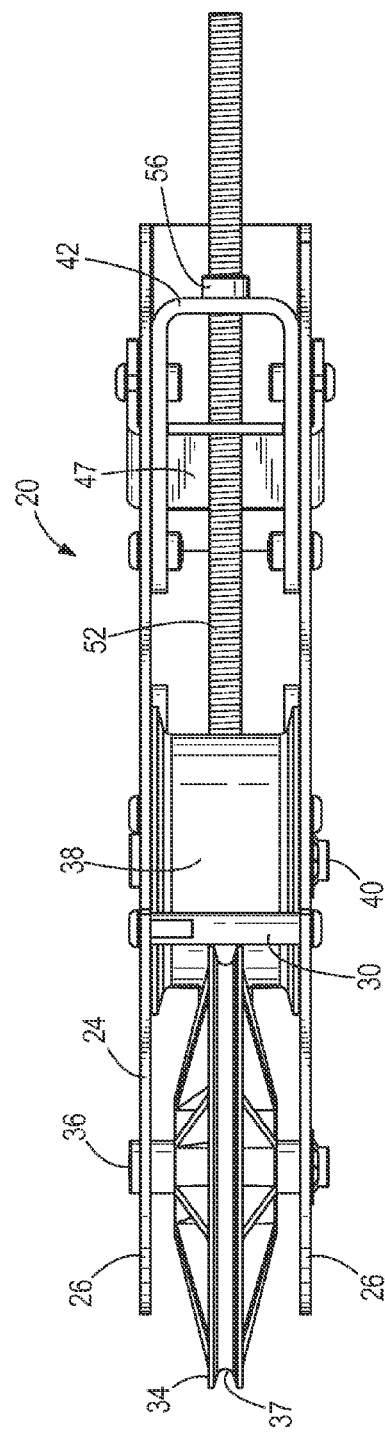
FIG. 8 is a bottom view of the loft block assembly of FIG. 2.

A moveable hook support 48 is positioned between the side walls 26 for movement toward and away from the stationary hook support 42. The moveable hook support 48 includes a sloped surface 50 that is adapted to engage the lower edge of the ceiling truss 22. The moveable hook support 48 is moved relative to the stationary hook support 42 by a tension bolt 52. The tension bolt 52 is inserted through a washer 54 and the moveable hook support 48 and is threaded into a threaded insert 56 (FIGS. 5 and 8) on the stationary hook support 42. By virtue of this arrangement, rotation of the tension bolt 52 results in movement of the movable hook support 48 relative to the stationary hook support 42 to clamp the loft block assembly 20 to the truss 22.

The loft block assembly 20 further includes a suspender 60 that is sandwiched between one of the spacers 30 and the side walls 26 of the hanger 24. The suspender 60 has an inverted V-shape and is positioned such that the upper portion of the inverted V wraps around the upper surface of the tension bolt 52, as best shown in FIG. 5. The purpose of the suspender 60 is to inhibit downward rotation of the hanger 24 relative to the I-beam truss 22 as force is applied to the cables 16.

Figure 6:
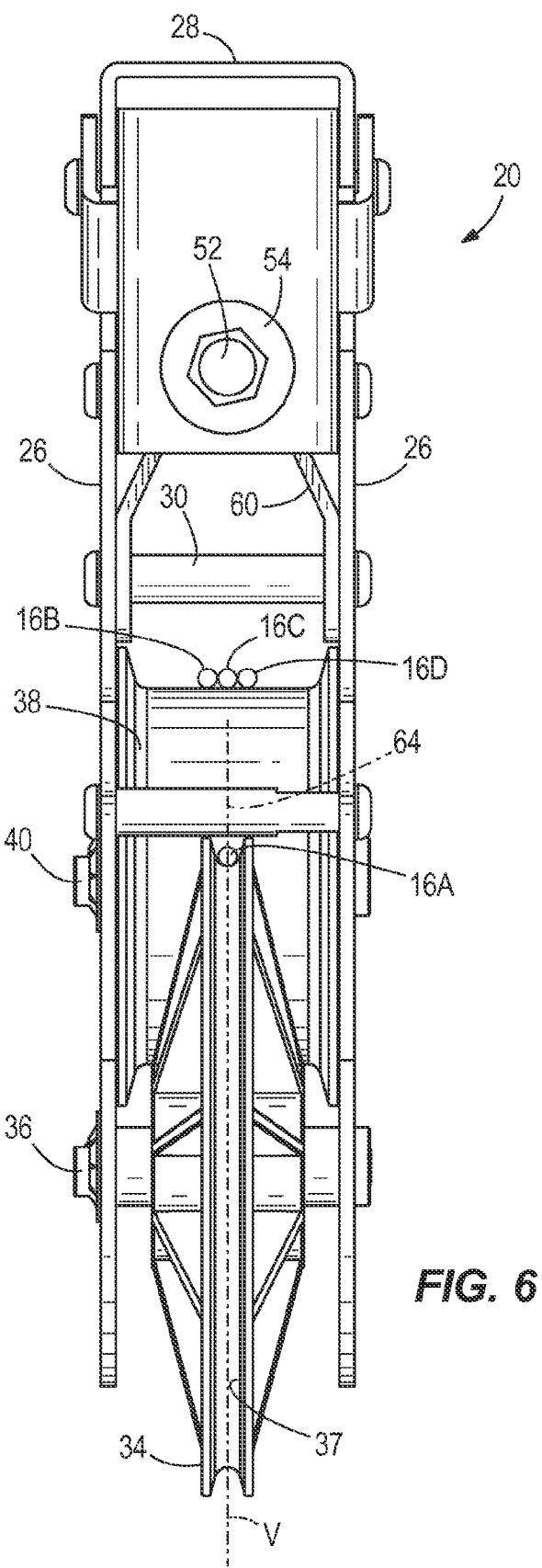
FIG. 6 is a front view of the loft block assembly of FIG. 2.
Figure 7:
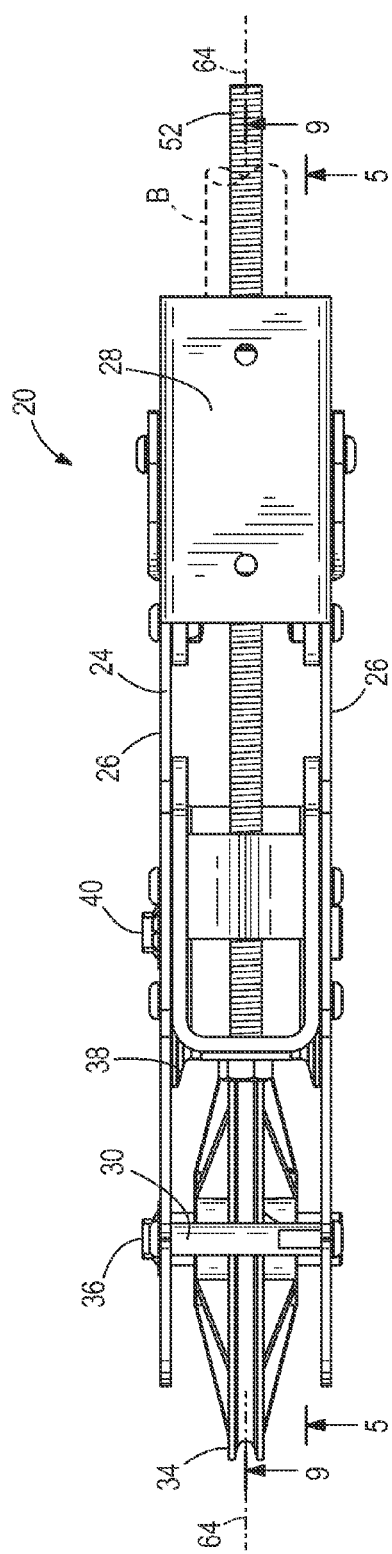
FIG. 7 is a top view of the loft block assembly of FIG. 2.
Figure 9:
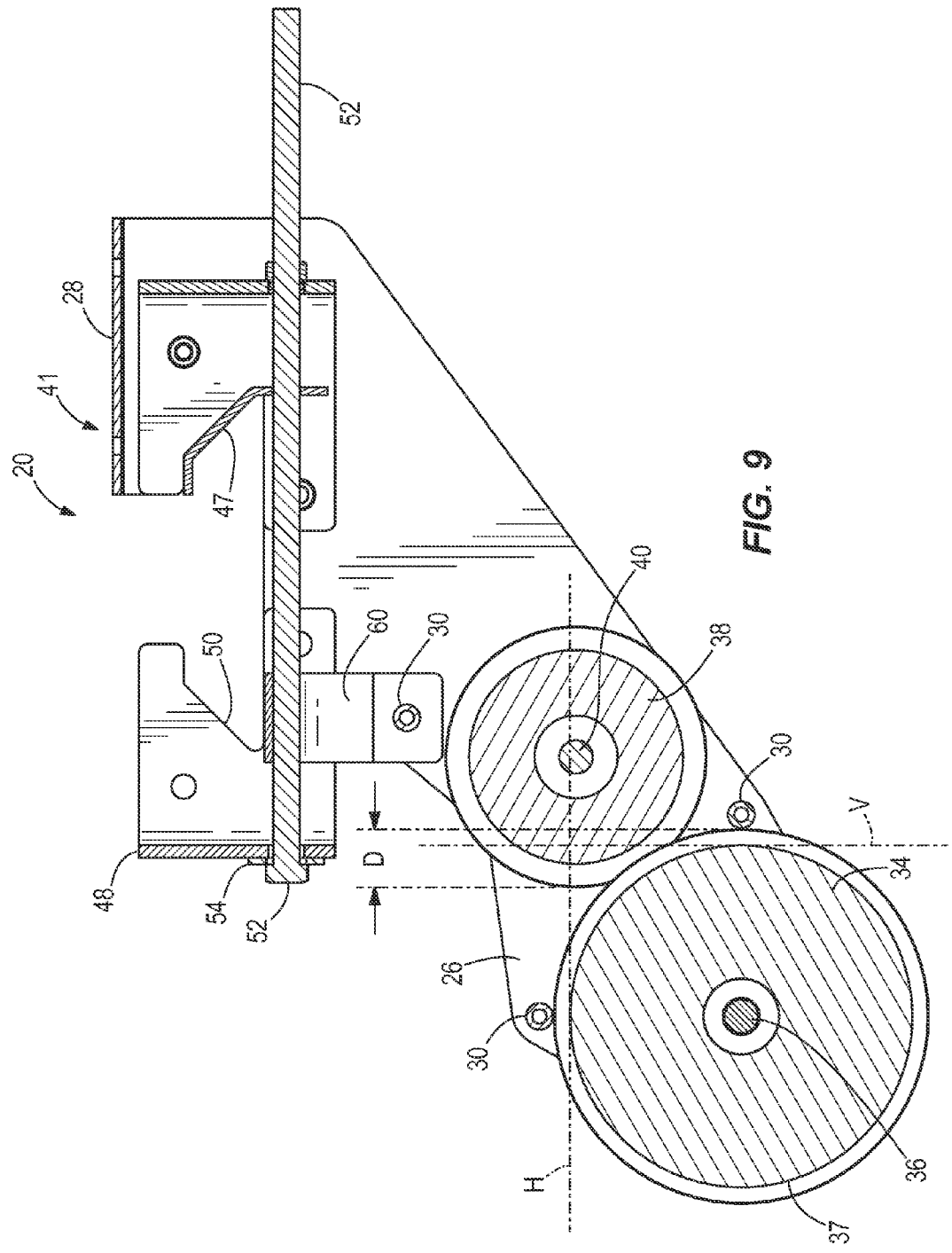
FIG. 9 is a side section view taken along line 9-9 in FIG. 7.

Referring to FIGS. 6 and 7, it can be seen that both the idler sheave 38 and the loft sheave 34 are centered between the side walls 26 of the hangar 24. In this regard, a vertical plane 64 perpendicular to the sheave axle 36 and centered on the loft sheave 34, as illustrated in FIG. 6, will pass through the center of the idler sheave 38 and perpendicular to the idler axle 40. Referring to FIG. 7, it can be seen that the idler sheave 38 and loft sheave 34 are also aligned with the batten B. In addition, referring to FIG. 9, it can be seen that a portion of the idler sheave 38 vertically overlaps with the loft sheave 34 by a horizontal distance D, and thus is positioned vertically above a portion of the loft sleave 34. Alternatively stated, as shown in FIG. 9, a portion of the idler sheave 38 is located above the horizontal axis H of the cable 16A and the vertical axis V of the cable 16A extends through the idler sheave 38 because the idler sheave 38 is positioned in the plane 64 (FIG. 6). In the illustrated embodiment, the horizontal axis H of the cable 16A extends through the idler axle 40 such that about half of the idler sheave 38 is positioned above the horizontal axis H. In other embodiments, more or less than half of the idler sheave 38 can be positioned above the horizontal axis H.

Thus, the illustrated device provides, among other things, a loft block assembly that can be easily secured to an overhead truss. In addition the illustrated device improves the compactness of the design and aligns the forces on the loft block assembly by aligning the loft sheave with the idler sheave. Various features and advantages of the invention are set forth in the following claims.

The invention claimed is:

1. A lift system configured to lift an article, the lift system comprising:
   a first cable configured to be coupled to the article;
   a second cable configured to be coupled to the article;
   a drive mechanism coupled to the first cable and the second cable and operable to raise and lower the article;
   a first loft block including a first loft sheave to redirect the first cable from a first substantially horizontal axis to a first substantially vertical axis, and an idler sheave to direct the second cable along a second substantially horizontal axis; and
   a second loft block including a second loft sheave to redirect the second cable from the second substantially horizontal axis to a second substantially vertical axis, wherein the idler sheave of the first loft block is located at least partially above the first horizontal axis,
   wherein the first vertical axis extends through the idler sheave such that at least a portion of the idler sheave vertically overlaps with the first loft sheave.

2. The lift system of claim 1, wherein the first loft block includes a support adjacent a top end of the first loft block and configured to attach the first loft block to a structural member, wherein the idler sheave is located at least partially above the first horizontal axis such that at least a portion of the idler sheave is located between the first horizontal axis and the support in a direction along the first vertical axis.

3. The lift system of claim 1, wherein the first loft sheave is mounted for rotation about a loft axis and within a loft plane perpendicular to the loft axis, and wherein the idler sheave is mounted within the loft plane.

4. The lift system of claim 3, wherein the idler sheave is centered on the loft plane.

5. The lift system of claim 3, wherein the idler sheave is mounted for rotation in the loft plane.

6. The lift system of claim 5, wherein the idler sheave is mounted for rotation about an idler axis, and wherein the idler axis is parallel to the loft axis.

7. The lift system of claim 1, wherein the first and the second cables are wound and unwound around a common drum of the drive mechanism.

8. The lift system of claim 7, wherein a traction drive is coupled between drum and the first loft block, wherein the traction drive is operable to guide the first and the second cables from the drum to the first loft block.

9. The lift system of claim 1, further comprising a housing configured to be coupled to a structural member, the first loft sheave rotatably coupled to the housing about a sheave axis the idler sheave rotatably coupled to the housing about an idler axis, wherein the idler axis is positioned between the structural member and the sheave axis.

10. The loft block assembly of claim 1, wherein a portion of the second cable extends between the idler sheave of the first loft block and the drive mechanism at an oblique angle relative to the first cable.

11. A lift system configured to lift an article, the lift system comprising:
- a first cable configured to be coupled to the article;
- a second cable configured to be coupled to the article;
- a drive mechanism coupled to the first cable and the second cable and operable to raise and lower the article;
- a first loft block including a first loft sheave to redirect the first cable from a first substantially horizontal axis to a first substantially vertical axis, and an idler sheave to direct the second cable along a second substantially horizontal axis; and
- a second loft block including a second loft sheave to redirect the second cable from the second substantially horizontal axis to a second substantially vertical axis,
- wherein the idler sheave of the first loft block is located at least partially above the first horizontal axis and the first horizontal axis extends through the idler sheave.

12. The lift system of claim 11, wherein the first loft block includes a support adjacent a top end of the first loft block and configured to attach the first loft block to a structural member, wherein the idler sheave is located at least partially above the first horizontal axis such that at least a portion of the idler sheave is located between the first horizontal axis and the support in a direction along the first vertical axis.

13. The lift system of claim 11, wherein the first loft sheave is mounted for rotation about a loft axis and within a loft plane perpendicular to the loft axis, and wherein the idler sheave is mounted within the loft plane.

14. The lift system of claim 13, wherein the idler sheave is centered on the loft plane.

15. The lift system of claim 13, wherein the idler sheave is mounted for rotation in the loft plane.

16. The lift system of claim 15, wherein the idler sheave is mounted for rotation about an idler axis, and wherein the idler axis is parallel to the loft axis.

17. The lift system of claim 11, wherein the first and the second cables are wound and unwound around a common drum of the drive mechanism.

18. The lift system of claim 11, wherein the first vertical axis extends through the idler sheave such that at least a portion of the idler sheave vertically overlaps with the first loft sheave.

19. The lift system of claim 11, wherein a portion of the second cable extends between the idler sheave of the first loft block and the drive mechanism at an oblique angle relative to the first cable.

20. The lift system of claim 11, further comprising a housing configured to be coupled to a structural member, the first loft sheave rotatably coupled to the housing about a sheave axis, the idler sheave rotatably coupled to the housing about an idler axis, wherein the idler axis is positioned between the structural member and the sheave axis.

* * * * *